United States Patent

[11] 3,592,477

[72] Inventor William M. Winn
66 Foster Hollow Road, Bradford, Pa. 16701
[21] Appl. No. 859,511
[22] Filed Sept. 19, 1969
[45] Patented July 13, 1971

[54] AUTOMATICALLY CORRECT-SPEED TURNTABLES
10 Claims, 7 Drawing Figs.

[52] U.S. Cl. 274/9 A
[51] Int. Cl. G11b 25/04
[50] Field of Search 274/9, 1

[56] References Cited
UNITED STATES PATENTS
2,776,838 1/1957 Mueller 274/9 A
3,485,499 12/1969 Fukuda 274/9 A
FOREIGN PATENTS
1,135,197 8/1962 Germany 274/9 A
521,592 3/1955 Italy 274/9 A

*Primary Examiner*—Harry N. Haroian
*Attorney*—Alexander & Dowell

ABSTRACT: A turntable has a hole therethrough at a distance from the axis of rotation greater than the radius of the 45-r.p.m. records and less than the radius of the 33⅓-r.p.m. records. Three concentric annular metal rails insulated from each other and from the turntable are mounted coaxially of the turntable on the underside thereof. A microswitch is mounted on the underside of the turntable and has an arm extending upwardly through the hole adapted to be depressed by the weight of a low-speed record when placed thereon, the microswitch having a normally closed terminal, a normally open terminal, and a common terminal connected respectively to the three rails. A plastic member is pivoted to a fixed part of the record player below the turntable and carries three metallic rollers adapted to contact the three rails respectively when the member is swung upwardly. A spring yieldably urges the member to swing upwardly, and a solenoid is adapted when activated to swing the member downwardly. A relay memory electric circuit is provided including the microswitch terminals, rails, rollers, turntable motor, solenoid, and a source of electric current, also a main switch, whereby when the switch is turned "off" and the turntable is motionless and a record is placed on the turntable, the position of the arm will preset the relay memory circuit according to the diameter of the record, so that when the switch is subsequently turned "on" the rollers will be retracted away from the turntable and the latter rotated at the correct speed for that record.

INVENTOR

William M. Winn

BY Alexander & Dowell

ATTORNEYS

INVENTOR

William M. Winn

BY Alexander & Dowell

ATTORNEYS

AUTOMATICALLY CORRECT-SPEED TURNTABLES

DESCRIPTION OF INVENTION

This invention is a novel automatically correct-speed turntable for record players whereby the correct speed for the selected record to be played may be determined before the motor of the turntable is started.

The principal object of the invention is to provide an automatically correct-speed turntable device involving the use of microswitches mounted on a turntable and actuated by the weight of a recording, and more particularly according to the diameter of the record. When the turntable is motionless, a set of contact rollers connect with the microswitch terminals, so that when a record is placed on the turntable the microswitch terminals which are closed thereby will preset a relay memory circuit according to the diameter of the record, and therefore according to the speed at which it should be played. When the turntable is turned on, the contact rollers are retracted away from the turntable and the turntable is rotated at the correct speed.

This invention may be used on existing turntables on the market in order that the correct speed, for the selected record to be played, is determined before the motor of the turntable is started.

Although the necessity which brought about may invention was the alarming number of records played at improper speed on radio stations everywhere, my device may be used on a large number of different makes of turntables, record players, and ever so-called "jukeboxes." It may in fact be used on all but automatic record changers which allow more than one record to be deposited on the turntable at one time. The only other limitation to this device's use would be the required amount of space underneath the actual turntable, which in many cases would be possible to change to accommodate my invention by slight modification.

One of the great advantages of my invention is the elimination of a normal 33 ⅓-L.P. record being played at the wrong speed, or a 45-r.p.m. record being played at the improper speed. Although an extremely small number of records are recorded at a speed different from the great majority of 45- or 33 ⅓-r.p.m. records, and vary in the normal size, these records may be played at their proper speed with this device incorporated in existing record players, or turntables, simply by determining the speed of the so-called "odd record" in advance, playing a "normal" record of this predetermined speed, and then not stopping the turntable between records.

This device eliminates the need for a manual gearshift lever, which most turntables or record players incorporate; and with only minor changes in most existing turntable designs, my invention may be put into operation.

I will explain the invention with reference to the accompanying drawings which illustrate one practical embodiment thereof to enable others familiar with the art to adopt and use the same; and will summarize in the claims the novel features of construction, and novel combinations of parts, for which protection is desired.

The turntable 1 may be that used in the customary record player, same being adapted to receive thereon records of various diameters such as the 45-r.p.m. and the 33 ⅓-r.p.m. records, the 45-r.p.m. records being played at a higher speed than the 33 ⅓-r.p.m. records. The turntable itself is not a part of my present invention, except in modified form, the turntable being used along with the customary motor and gearshift device to achieve automatic speed change.

Figure 1:
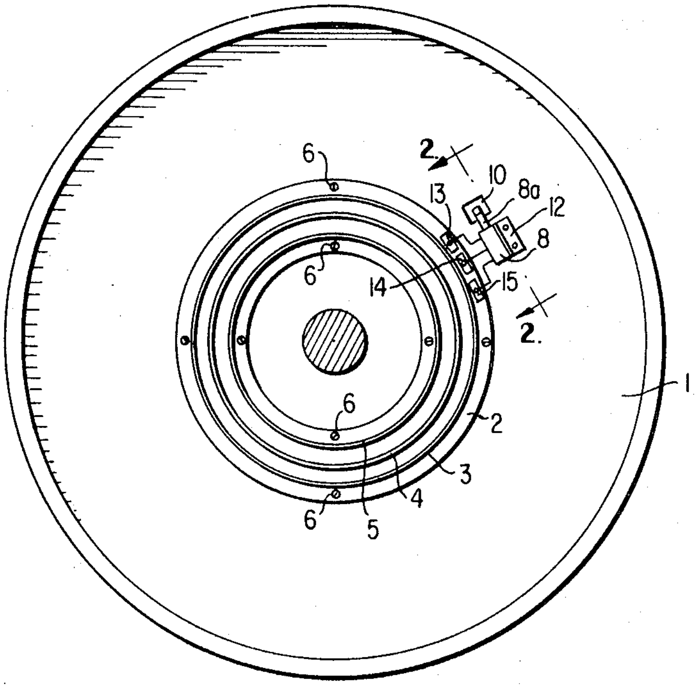
FIG. 1 is a bottom plan view of a turntable showing the arrangement of rails thereon which are respectively connected to the terminals of the microswitch mounted on the bottom of the turntable, the movable arm of which switch extends upwardly through a hole in the turntable.

FIG. 1 shows a bottom plan view of the turntable 1, and shows an annular flat ring 2 of molded plastic or other nonconducting material, which is secured to the underside of the turntable 1 by screws 6 or the like. Anchored in the ring 2 are three concentric rails 3, 4 and 5 of electrical-conducting material extending below the ring 2, the same being concentric with the axis of rotation of the turntable 1, and the rails having their upper ends preferably fused into the plastic of the molded ring 2 to insulate each rail from the other rails, for the purpose hereinafter described.

Figure 3:
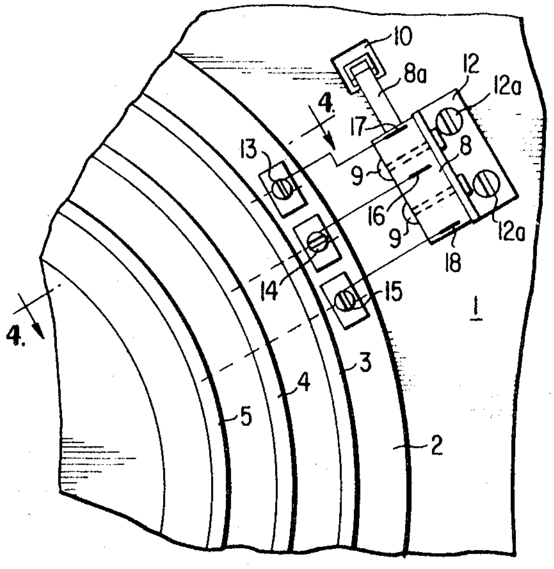
FIG. 3 is an enlarged view of the underside of the turntable showing the arrangement of rails and microswitches.
Figure 4:
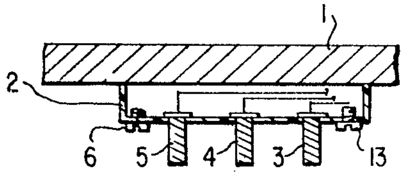
FIG. 4 is a section through the turntable taken on the line 4–4, FIG. 3.

Adjacent the edge of molded ring 2 are three terminals 13, 14 and 15, the terminal 13 being electrically connected to the rail 3, as shown in FIG. 3, while terminal 14 is directly connected to rail 4, and terminal 15 directly connected to the rail 5, as shown in FIG. 3. Adjacent the terminals 13, 14 and 15 a hole 10 is provided through the turntable 1 at a distance from its axis of rotation which is greater than that of the 45-r.p.m. records, but at less than the radius of the larger size 33 ⅓-r.p.m. records, so that when a 33 ⅓-r.p.m. record is placed on the turntable 1 the same will overlie the hole 10. On the underside of the turntable 1 is an L-shaped bracket 12 secured thereto by screws 12*a*, as shown in FIG. 3 and secured to the vertical flange of the bracket 12 is a microswitch 8, the same being secured by bolts 9.

Figure 2:
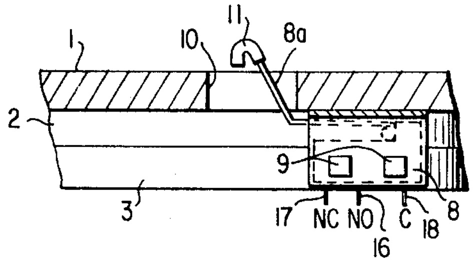
FIG. 2 is an enlarged section on the line 2–2, FIG. 1.

The switch arm 8*a* of the microswitch 8 extends angularly upwardly through the hole 10 in the turntable 1 and is provided on its upper end with a rubberlike flexible sleeve 11, FIG. 2, so that the contacting face of the larger size 33 ⅓-r.p.m. records will be protected from the metal of the arm 8*a* of the microswitch.

By the above construction when the larger size 33 ⅓-r.p.m. records are placed on the turntable 1 the microswitch arm 8*a* will be depressed to actuate the microswitch 8. The microswitch is provided with the customary terminals, to wit, a NC (normally closed) terminal 17, a NO (normally opened) terminal 16, and a C (common) terminal 18. As shown in FIG. 3 the NC terminal 17 of the microswitch is electrically connected to the rail 3 through the terminal 13. The NO terminal 16 of the microswitch is electrically connected to the rail 4 through the terminal 14, while the C terminal 18 of the microswitch is electrically connected to the rail 5 through the terminal 15, for the purpose hereinafter described.

Figure 5:
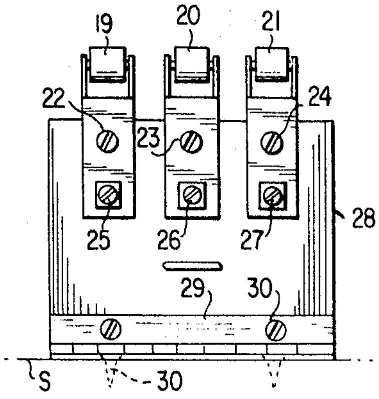
FIG. 5 is an elevational view of the mounting means for the rollers which engage the respective rails which are secured to the underside of the turntable.
Figure 6:
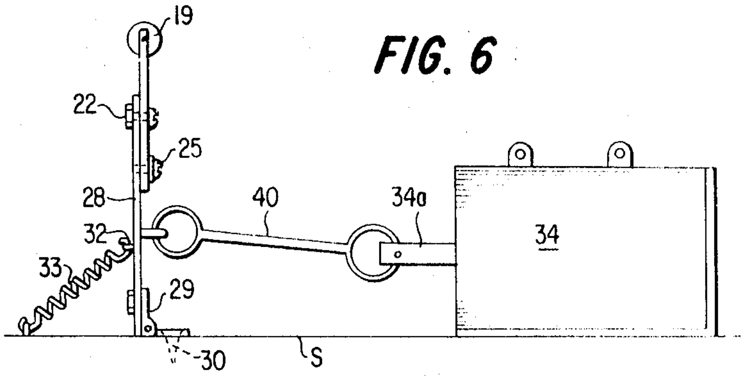
FIG. 6 is a side elevational view of the parts shown in FIG. 5 and showing the means for retracting the rollers from the rings carried by the underside of the turntable.

Below the turntable 1 within the record player casing is a rectangular plastic member 28 which is pivotally secured at the bottom thereof to a fixed portion S of the record player casing, or secured to a bracket in the casing, by means of a hinge 29 which is connected to the member 28 and to the fixed portion of the casing by screws 30 or the like, as shown in FIGS. 5 and 6, the upper edge of the member 28 terminating below the rails 3, 4, 5 of the turntable 1.

Extending above the top of the member 28 are three brackets of electrical conducting material, carrying at their upper ends rollers 19, 20 and 21, respectively, the brackets being secured to the member 28 by screws 22, 23, 24 or the like, and the brackets carrying terminals 25, 26 and 27 respectively adapted to be connected in the electrical circuit hereinafter described.

Figure 7:
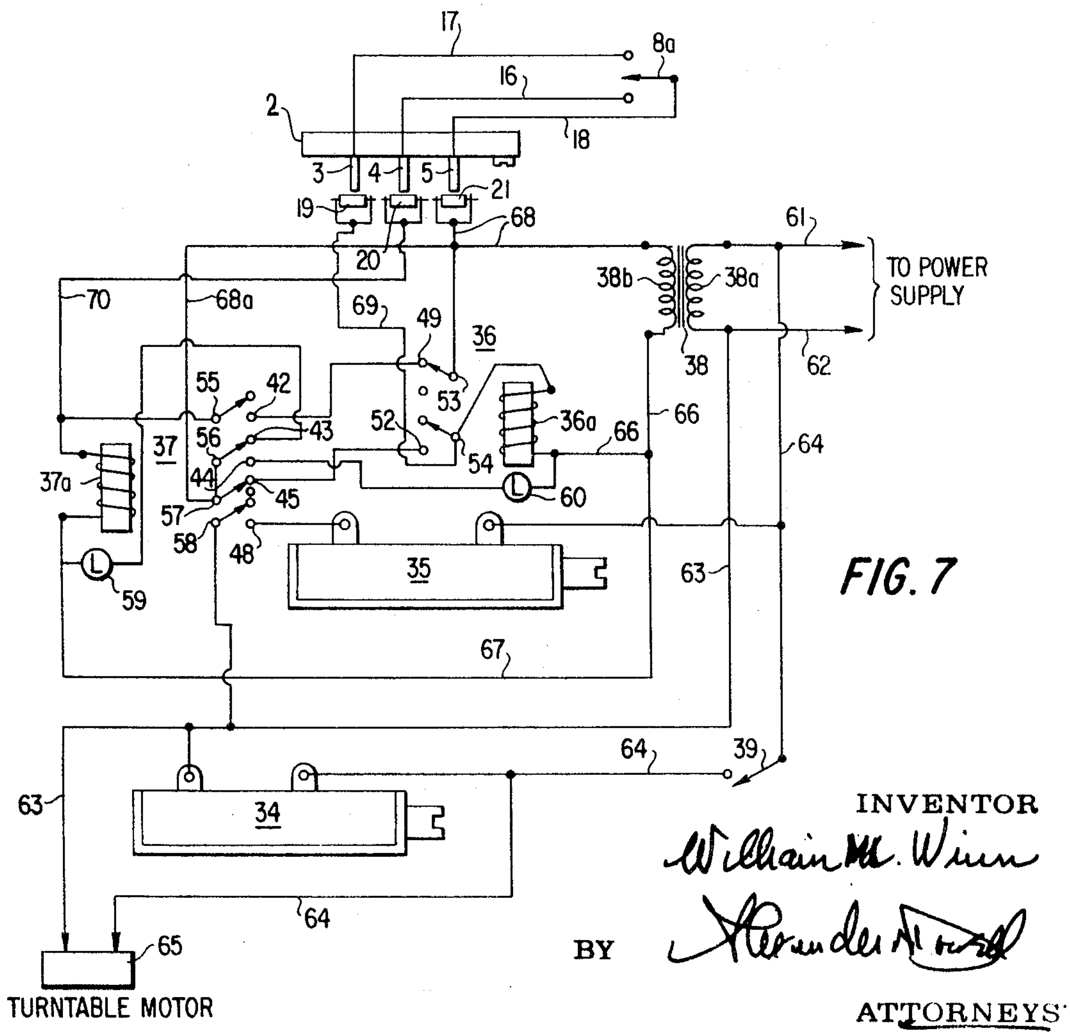
FIG. 7 is a view showing the electric circuit for actuating the device.

The rollers 19, 20 and 21 are adapted to contact respectively their related rails 3, 4 and 5 as indicated in FIG. 7 when the plastic member 28 is in normal raised position indicated in FIG. 6. A spring 33, FIG. 6, has one end 32 secured to one face of the plate 28, as shown in FIG. 6, while its other end is anchored to the fixed support S of the record player casing, the spring 33 normally urging the member 28 to be in upright position of the hinge 29 to bring the rollers 19, 20 and 21 in contact with the rails 3, 4 and 5.

On the other side of the member 28 is a solenoid 34 having a movable core 34*a* connected by a link 40 to the member 28 adapted so that when the solenoid is activated it urges member 28 to pivot on the hinge 29 to bring the rollers 19, 20 and 21 out of contact with the respective rails 3, 4 and 5.

The supports S, FIGS. 5 and 6, may be a platform determined by the model of the record player with which the invention is used and the solenoid 34 is utilized to pull the rollers 19, 20 and 21 away from the rails 3, 4 and 5 at the base of the turntable.

FIG. 7 shows a diagrammatic view of the action occuring when microswitch arm 8*a* is changed from one position to another, by the weight of a large diameter record on the turntable 1 or by the lack of any such weight. The microswitch 8 is a single pole, double throw switch so that it is always in a closed and never open position (except for that fraction of a second that a record is put on or taken off the arm 8*a* which activates the switch 8). It is closed either to activate one relay 36 or the other relay 37.

The primary winding 38*a* of transformer 38 is connected across power input leads 61—62, which leads are also connected by conductors 63—64 to the turntable motor 65, and solenoid 34, conductor 64 having therein a main switch 39. One end of the secondary winding 38*b* of the transformer 38, which is the power supply for the relays 36—37, is connected to the one end of the coils 36*a*, 37*a* of relays 36—37 by wires 66 and 67. The other end of secondary winding 38*b* of transformer 38 is connected to roller 21 by conductor 68 and to contact 57 of relay 37 by wire 68*a*. The current flows through rail 5 and to terminal 18 of microswitch 8. When there is no pressure on the microswitch arm 8*a*, the current flows from terminal 18 of the microswitch to terminal 17 thereof and then to rail 3 on to roller 19 then to terminal 54 of relay 36 through conductor 69. Only a momentary contact is needed to activate relay 36. Once it is activated the rollers 19, 20, 21 and rails 3, 4 and 5 are no longer needed to keep it activated. The same holds true once the other relay 37 is activated by the rail-roller flow dictated by the position of microswitch arm 8*a*. With relay 37 deactivated it allows current to flow from the terminal or connection of roller 21 to terminal 57 on relay 37 through wire 68*a* to terminal 54 on relay 36 which is connected to one side of the coil 36*a* that activates the relay 36. Relay 36 will remain activated until relay 37 is activated or the power to transformer 38 is removed, which would then find both relays 36—37 in deactivated positions. In other words, as long as there is an output from transformer 38 either relay 36 or 37 will be activated, but never both at the same time.

When relay 36 is activated as described above, and a record is placed on turntable 1 which is large enough in diameter to lower the arm 8*a* of microswitch 8, current will flow from the secondary 38*b* of transformer 38 to roller 21, through rail 5, and to terminal 16 of microswitch 8 onto rail 4 and onto roller 20 then to contact 55 of relay 37 through wire 70. Only a momentary contact is needed to activate relay 37. Once it is activated the rollers 19, 20, 21 and rails 3, 4 and 5 are no longer needed to keep it activated, since relay 36 is deactivated and in the process allows current to flow from the terminal of roller 21 to terminal 53 on relay 36 to terminal 49 on relay 36, and over to terminal 42 on relay 37, and then to terminal 55 on relay 37 which is connected to one side of the coil 37*a* that activates the relay 37. Relay 37 will remain activated until relay 36 is activated or power to transformer 38 is removed, at which time both relays 36—37 would not then be in the activated positions. In addition to the above-described action, when relay 37 is activated terminal 58 on relay 37 allows 110v. AC current to flow to terminal 48 on relay 37 and thus activates solenoid 35 which provides the movement to change gears on any turntable from 45 to 33 ⅓-r.p.m.

When main switch 39 is closed the turntable motor 65 starts and solenoid 34 is activated and the rollers 19, 20, 21 are pulled away from the rails 3, 4, 5 at the base of the turntable 1. When this happens whichever relay was activated prior to the movement of solenoid 34 remains activated until the switch 39 is thrown to an open position allowing solenoid 34 to become deactivated and permitting the rollers 19, 20, 21 to again make contact with the rails 3, 4, 5.

A red pilot light 59 may be used to indicate the speed of turntable 1 at 45 r.p.m. and is wired to contact 43 of relay 37 and to wire 67. With contacts 56 and 57 on relay 37 connected, when relay 37 is not activated, the red pilot light 59 will be activated.

A green pilot light 60 may be used to indicate the speed of turntable 1 at 33 ⅓ r.p.m., and is wired to contact 44 on relay 37. With contacts 56 and 57 on relay 37 connected when relay 37 is activated the green pilot light 60 will be activated. The other connection on both pilot lights 59, 60 goes to the other side of transformer 38.

The contact 45 of relay 37 is used as part of the holding function for relay 36 and is connected to contact 52 on relay 36. Contact 49 on relay 36 serves as part of the holding function of relay 37 when activated and is connected with contact 42 of relay 37. Contact 52 on relay 36 serves as part of the holding function for relay 36 when activated. Contact 53 on relay 36 is connected with roller 21, and when it makes contact with contact 49 same will hold relay 37 in activated position. When relay 37 is not activated contact 57 serves as part of the holding function for relay 36 by way of contact 45 on relay 37 to contact 52 on relay 36 and onto contact 54 and onto one side of coil 36*a* which activates relay 36. Contact 58 on relay 37 which when relay 37 is activated closes circuit to activate solenoid 35, provides the movement to change gears on the turntable from 45 to 33 ⅓ r.p.m.

The actual speed changing is accomplished by the movement of solenoid 35 which is relay activated. The relays are activated by the weight of a record or the absence of weight on the turntable-mounted microswitch. The solenoid may have to have different length of strokes for the different existing varieties of turntables, record players, "jukeboxes," etc. to fit their method of changing speeds. This invention however provides the motion at the proper time for a speed change. How this motion is used, where the solenoid is mounted, will vary with the large variety of existing designs of turntables and their associated hardware. The same is true when it comes to mounting of the rails on the circular plastic beneath the turntable. It may, on some turntables, due to space requirements be mounted near the outside edge. The different makes of turntables will also require different sized rails, rollers and the hinged plastic member attached to the rollers. However, the principle would remain the same on all applications.

I claim:

1. In a record player, a turntable adapted to hold records of various diameters normally to be played at different speeds respectively; an electric motor for rotating the turntable through a gearshift; said turntable having a hole therethrough at such distance from the axis of rotation as to underlie the perimeter of the lower speed records; three concentric annular metallic rails insulated from each other and from the turntable mounted coaxially of the turntable on the underside thereof; a microswitch on the underside of the turntable having an arm extending upwardly through said hole and adapted to be depressed by the weight of a lower speed record when placed on the turntable, said microswitch having a normally closed terminal, a normally open terminal, and a common terminal connected respectively to the three rails; a plastic member pivoted to a fixed part of the record player below the turntable; three metallic rollers mounted on said member adapted to contact the said three rails respectively when the member is swung upwardly; means yieldably urging the member to swing upwardly; a solenoid adapted when activated to swing the member downwardly; and a relay memory electric circuit including said microswitch terminals, said rails, said rollers, said turntable motor, said solenoid, a source of electric current, and a main switch, whereby when the switch is turned "off" and the turntable is motionless and a record is placed on the turntable, the position of said arm will preset said relay memory circuit according to the diameter of the record, so that when the switch is subsequently turned "on" the said rollers will be retracted away from the turntable and the latter rotated at the correct speed for said record.

2. In a record player as set forth in claim 1, said plastic member being pivotally mounted at its lower end to said fixed part of the record player; metallic brackets extending from the upper end of the member and carrying terminals adapted to be connected in the relay memory circuit; and said rollers being journaled in the upper ends of said brackets respectively, whereby when the solenoid is activated the rollers will be pulled away from the rails.

3. In a record player as set forth in claim 1, an annular flat ring of plastic material on the underside of the turntable; and said concentric rails having their upper portions embedded in said plastic ring with their lower portions exposed for engagement with said rollers.

4. In a record player as set forth in claim 1, a plastic sleeve on the upper end of said arm of the microswitch to protect the record on the turntable from the metal of the arm.

5. In a record player as set forth in claim 1, said relay memory circuit comprising a transformer whose primary coil is connected to said source of electric current; the turntable motor and said solenoid being also connected through said main switch to said source; a pair of relays; one end of the secondary winding of said transformer being connected to one end of the coils of said relays, the other end of said secondary being connected to the roller associated with the common terminal of the microswitch and to one contact of one relay, whereby when no pressure is applied on the microswitch arm current will flow from the common terminal of the microswitch through the normally closed terminal to actuate said one relay, and when pressure is applied to the microswitch arm current will flow from the common terminal to the normally open terminal of the microswitch to activate the other said relay, either relay remaining activated until the other is activated or the power input to the transformer removed; and a second solenoid which activates the gearshift of the turntable having one end connected to a contact on said one relay and to a power input lead whereby when said one relay is activated current will flow to said second solenoid.

6. In a record player, a turntable adapted to hold records of various diameters normally to be played at speeds of 33 ⅓-r.p.m. and 45-r.p.m. respectively; an electric motor for rotating the turntable through a gearshift; said turntable having a hole extending therethrough at a distance from the axis of rotation greater than the radius of the 45-r.p.m. records and less than the radius of the 33 ⅓-r.p.m. records; three concentric annular metallic rails insulated from each other and from the turntable mounted coaxially of the turntable axis on the underside thereof; a microswitch mounted on the underside of the turntable having an arm extending upwardly through said hole and adapted to be depressed by the weight of a 33 ⅓-r.p.m. record when placed on the turntable, said microswitch having a normally closed terminal, a normally open terminal, and a common terminal connected respectively to the three rails; a plastic member pivoted to a fixed part of the record player below the turntable; three metallic rollers mounted on said member adapted to contact the said three rails respectively when the member is swung upwardly; means yieldably urging the member to swing upwardly; a solenoid adapted when activated to swing the member downwardly; and a relay memory electric circuit including said microswitch terminals, said rails, said rollers, said turntable motor, said solenoid, a source of electric current, and a main switch whereby when the switch is turned "off" and the turntable is motionless and a record is placed on the turntable, the position of said arm will preset said relay memory circuit according to the diameter of the record so that when the switch is subsequently turned "on" the said rollers will be retracted away from the turntable and the latter rotated at correct speed for said record.

7. In a record player as set forth in claim 6, said plastic member being pivotally mounted at its lower end to said fixed part of the record player; metallic brackets extending from the upper end of the member and carrying terminals adapted to be connected in the relay memory circuit; and said rollers being journaled in the upper ends of said brackets respectively, whereby when the solenoid is activated the rollers will be pulled away from the rails.

8. In a record player as set forth in claim 6, an annular flat ring of plastic material on the underside of the turntable; and said concentric rails having their upper portions embedded in said plastic ring with their lower portions exposed for engagement with said rollers.

9. In a record player as set forth in claim 6, a plastic sleeve on the upper end of said arm of the microswitch to protect the record on the turntable from the metal of the arm.

10. In a record player as set forth in claim 1, said relay memory circuit comprising a transformer whose primary coil is connected to said source of electric current; the turntable motor and said solenoid being also connected through said main switch to said source; a pair of relays; one end of the secondary winding of said transformer being connected to one end of the coils of said relays the other end of said secondary being connected to the roller associated with the common terminal of the microswitch and to one contact of one relay whereby when no pressure is applied on the microswitch arm current will flow from the common terminal of the microswitch through the normally closed terminal to actuate said one relay, and when pressure is applied to the microswitch arm current will flow from the common terminal to the normally open terminal of the microswitch to activate the other said relay, either relay remaining activated until the other is activated or the power input to the transformer removed; and a second solenoid which activates the gearshift of the turntable having one end connected to a contact on said one relay and to a power input lead whereby when said one relay is activated current will flow to said second solenoid.